United States Patent [19]

Meister

[11] Patent Number: 5,442,999
[45] Date of Patent: Aug. 22, 1995

[54] VERTICAL SPIT FOR A DISPLAY, ROASTING OR WARMING OVEN

[75] Inventor: James L. Meister, Rockford, Ill.

[73] Assignee: The Broaster Company, Beloit, Wis.

[21] Appl. No.: 235,112

[22] Filed: Apr. 28, 1994

[51] Int. Cl.⁶ .................... A47J 37/04; A47J 43/18; A47F 7/00
[52] U.S. Cl. ...................... 99/426; 99/419; 99/421 V; 99/448
[58] Field of Search ............... 99/341, 446, 448, 427, 99/419, 426, 420, 421 R, 421 A, 421 V, 421 HV; 126/41 A, 273; 211/181; 219/214; D7/338

[56] References Cited

U.S. PATENT DOCUMENTS

| | | | |
|---|---|---|---|
| D. 39,996 | 5/1909 | Michaelis | 211/181 X |
| 155,789 | 10/1874 | Camp | 99/421 A |
| 216,926 | 3/1870 | Schindler . | |
| 238,471 | 1/1876 | Roderick . | |
| 439,569 | 10/1890 | Ahrens | 211/181 X |
| 637,208 | 11/1899 | Hughes et al. | 211/181 X |
| 1,606,451 | 11/1926 | Sanders . | |
| 1,760,339 | 5/1930 | Bishop | 211/120 |
| 1,990,580 | 2/1935 | Ashby . | |
| 1,991,156 | 2/1935 | Kahn . | |
| 2,023,804 | 12/1935 | Donalies et al. | 211/181 X |
| 2,945,598 | 7/1960 | Rallis . | |
| 3,665,843 | 5/1972 | Moore . | |
| 3,952,876 | 4/1976 | Price | 211/181 X |
| 3,986,445 | 10/1976 | Hooton . | |
| 4,401,018 | 8/1983 | Berry | 99/448 |
| 4,590,848 | 5/1986 | Willingham | 99/421 V |
| 4,691,832 | 9/1987 | Steiger | 211/181 |
| 5,044,262 | 9/1991 | Burkett et al. | 99/421 R |

FOREIGN PATENT DOCUMENTS

| | | | |
|---|---|---|---|
| 16219 | of 1891 | United Kingdom . | |
| 592641 | 5/1945 | United Kingdom . | |
| 605497 | 12/1945 | United Kingdom . | |
| 2232876 | 1/1991 | United Kingdom | 99/448 |

Primary Examiner—Timothy F. Simone
Attorney, Agent, or Firm—McDermott, Will & Emery

[57] ABSTRACT

The invention comprises a vertical spit for retaining one or more fowl such as chickens or other birds during display, roasting, and warming. The vertical spit comprises a unitary zig-zagging rod comprising two or more roast retaining means, each roast retaining means comprising a downwardly projecting cradle portion for holding trussed legs of the fowl and an upwardly projecting triangular portion for insertion into a carcass of the fowl. Each roast retaining means is positioned in continuous vertical relationship and preferably each roast retaining means projects from an opposite side of the vertical spit from an adjacent roast retaining means.

2 Claims, 1 Drawing Sheet

VERTICAL SPIT FOR A DISPLAY, ROASTING OR WARMING OVEN

FIELD OF THE INVENTION

The invention pertains to racks or spits used in food display, roasting, or warming. More particularly, the invention pertains to spits for retaining fowls such as chickens or birds during display, roasting or warming.

BACKGROUND OF THE INVENTION

Roasting racks or holders for retaining foods and meats are well known. Examples of such racks are shown in U.S. Pat. Nos. 1,990,580, 2,945,598, 3,665,843, and 3,986,445. Many of these prior art roasting racks are complicated designs with a variety of interlocking parts. For example, in U.S. Pat. No. 1,990,580, a truss-frame is disclosed which comprises a cage which is inserted in the carcass of a bird to engage with the spine and support the carcass from the inside. A second part supports the carcass from the outside and has means for engaging the legs and wings of the carcass. The two parts interlock with a locking bar to prevent a bird from falling out of the truss-frame.

In U.S. Pat. No. 2,945,598, a rotary food holder for a cooking machine is shown for rotating food in the presence of radiant heat. This device provides a plurality of vertically spaced food racks which comprise horizontally disposed mounting members connected to one another by connecting members. Secured to each mounting member is a circular frame element for supporting grid elements.

U.S. Pat. No. 3,665,843 discloses a roasting rack comprising a rectangular open wire frame and a support slidably arranged on each of the longer sides of the rack with roast piercing points on each support. The supports may be adjusted in length to accommodate different sized roasts.

U.S. Pat. No. 3,986,445 shows a rack for baking fish, poultry or the like which comprises a base, an upright support framework, a transverse frame for spreading and holding the interior of the animal in opened condition and a holding structure. Seasonings such as onions or garlic may be mounted in the interior of the animal on the holding structure.

U.S. Pat. No. Des. 216,926 shows a pie display and warming cabinet having horizontal shelves which somewhat resemble shoe racks. U.S. Pat. No. Des. 238,471 discloses another food display oven having two parallel vertical racks which appear to form horizontal tray holders.

The prior art is lacking in a simple, easy-to-use roasting rack for retaining one or more chickens, birds, or other fowl during roasting, warming, or display, with no need for ties, bracing, piercing, or locking devices. Further, none of the prior art roasting racks show a simple upright spit which enables a roast such as a chicken, bird, or other fowl to be easily placed on and removed from the roasting rack without manipulation of several parts.

It is therefore an object of the present invention to provide an easy-to-use vertical rack or spit for retaining one or more meats such as chickens, birds, or the like. It is another object to provide a vertical roasting spit which enables a chicken, bird, or other fowl to be easily placed on and removed from the roasting spit with no need for ties, bracing, puncturing or locking devices. It is another object to provide a vertical spit which will retain one or more chickens, birds, or other fowl in a small amount of space. It is yet another object to provide a vertical spit which enables optimum exposure of the meat to heat used in cooking or warming.

SUMMARY OF THE INVENTION

The above objects are accomplished by the present invention which is a vertical spit for retaining one or more fowl such as chickens, birds or the like during display, roasting or warming. The vertical spit of the invention comprises a unitary zig-zagging rod comprising two or more roast retaining means, each roast retaining means comprising:

(a) a downwardly projecting cradle portion for holding trussed legs of the fowl; and
(b) an upwardly projecting triangular portion for insertion into a carcass of the fowl;

wherein each roast retaining means is positioned in continuous vertical relationship along the vertical spit. Preferably, each roast retaining means on said spit projects from an opposite side of the vertical spit from an adjacent roast retaining means.

It is to be understood that while the vertical spit of the invention is preferably used for displaying, roasting, or warming chickens, birds, or other fowl, it is equally applicable to many animals or fish having a carcass that can be inserted over a rack and having legs or similar structure that can be secured in a cradle structure as shown and described herein.

DETAILED DESCRIPTION OF THE INVENTION

As used herein, the terms "fowl", "roast" or "meat" refers to any chicken, bird, fowl, or similar animal or fish that comprises a carcass which can be placed over a rack and has legs or similar structure which can be secured in a cradle structure as shown and described herein.

Figure 3:
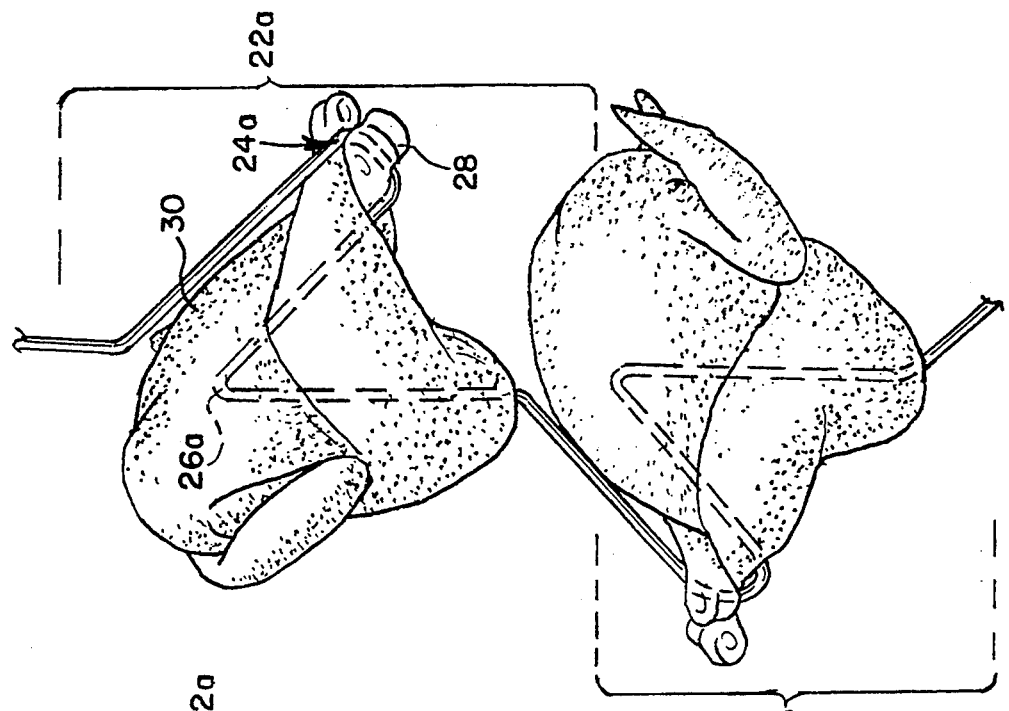
FIG. 3 is a perspective view of two chickens positioned on roast retaining means on the vertical spit of FIGS. 1 or 2.
Figure 2:
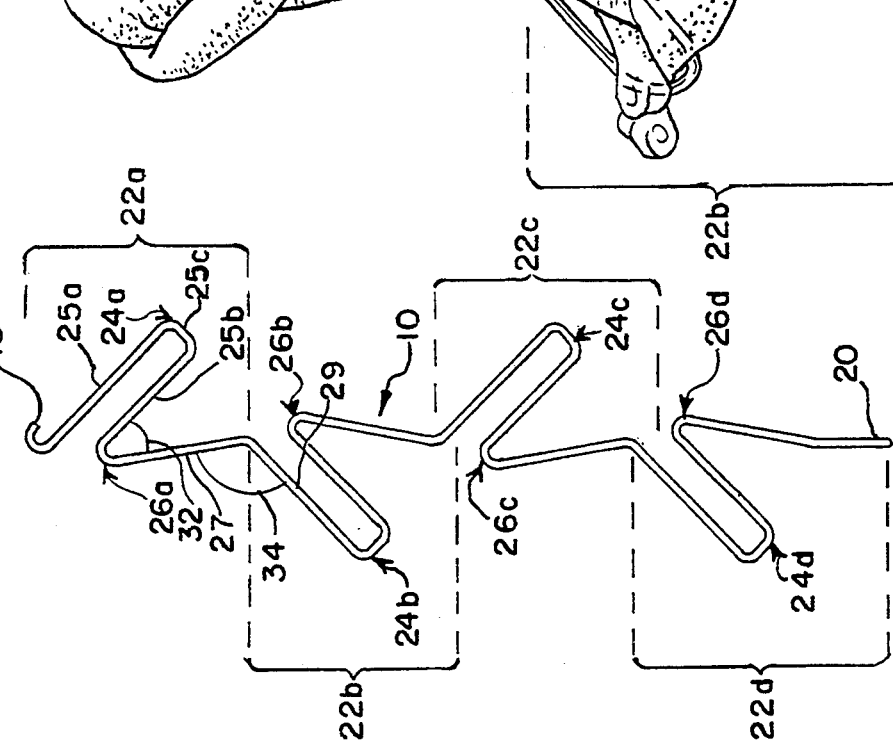
FIG. 2 is a side elevation of the vertical spit of FIG. 1.
Figure 1:
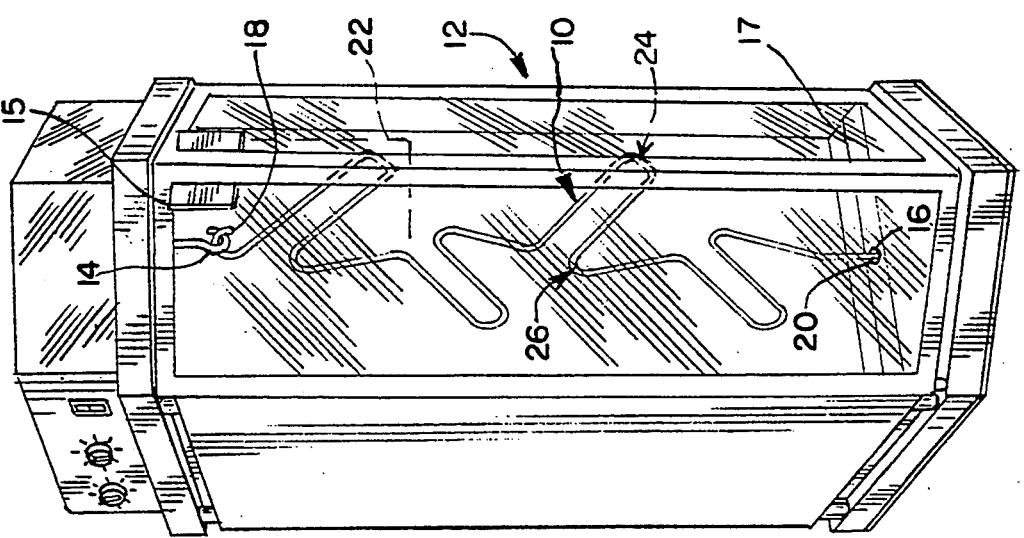
FIG. 1 is a perspective view of the vertical spit of the invention positioned in a display or roasting/warming oven.

As shown in FIGS. 1, 2, and 3, the vertical spit 10 of the invention is used in conjunction with a display case or roasting or warming oven 12. The vertical spit 10 can be easily retained in the display case or oven 12 by upper and lower vertical spit retaining means 14, 16 on the upper and lower surfaces 15, 17, respectively, of the display case or oven 12. The vertical spit retaining means 14, 16 may comprise any suitable means for retaining the vertical spit 10 in a substantially vertical position in its display case or oven 12. For example, the upper vertical spit retaining means 14 may comprise a positioning hole or loop (shown in FIG. 1) for catching and retaining an upper end 18 of the vertical spit 10. Similarly, the lower vertical spit retaining means 16 may comprise a positioning hole (shown in FIG. 1) or loop in a lower surface 17 of the display case or oven 12 for catching and retaining the lower end 20 of the vertical spit 10.

In a preferred embodiment, at least one of the upper and lower retaining means 14, 16 is connected to a rotating device which is well known in the art for optional rotation of the vertical spit 10 in the case or oven 12 when the vertical spit 10 is in position in the upper and lower retaining means 14, 16.

In another embodiment (not shown), the vertical spit 10 of the invention may be used in conjunction with a case or display oven 12 having only an upper vertical spit retaining means 14, so that the vertical spit hangs from the upper surface of the oven with no lower retaining means. However, in the preferred embodiment of this invention, lower vertical spit retaining means 16 are used to enable optimal stability of the vertical spit 10 in the display case or oven 12.

The vertical spit 10 of this invention comprises two or more roast retaining means, such as roast retaining means 22a, b, c, and d. Each roast retaining means comprises a downwardly projecting cradle portion such as cradle portions 24a, b, c, and d and an upwardly projecting triangular portion such as triangular portions 26a, b, c, and d.

In a preferred embodiment, the roast retaining means 22a, b, c, or d are positioned in continuous vertical relationship along the vertical spit 10. In a most preferred embodiment, the roast retaining means are positioned in continuous vertical relationship along the vertical spit 10 so that each roast retaining means 22a, b, c, or d projects from an opposite side of the vertical spit 10 from an adjacent roast retaining means. This arrangement enables optimal positioning of fowl on the vertical rack for display, roasting, or warming, while using the least amount of space possible. This arrangement also enables a symmetrical positioning of fowl on the vertical spit 10.

Further, in a preferred embodiment best seen in FIG. 2 and illustrated by the cradle portion 24a, each cradle portion 24a, b, c, and d is formed by first and second parallel legs such as 25a and b, respectively, joined at the lower ends of the legs by a connecting bottom portion 25c. Similarly, in a preferred embodiment best seen in FIG. 2 and illustrated by the triangular portion 26a, each triangular portion 26a, b, c, and d is formed by first and second legs such as 25b and 27. In the preferred embodiment of the invention as shown in FIG. 2, the second leg such as 25b of the downwardly projecting cradle portion 24a is one and the same with and forms the first leg 25b of the adjacent upwardly projecting triangular portion 26a.

The downwardly projecting cradle portions 24a, b, c, and d and the upwardly projecting triangular portions 26a, b, c, and d may be positioned at suitable angles on the vertical spit 10 to enable the roast retaining means 22a, b, c, or d to hold the carcass of a fowl 30 over the upwardly projecting triangular portions 26a, b, c, and d and to hold the trussed legs 28 in the downwardly projecting cradle portions 24a, b, c, and d with no need for strings, ties, clips, or other attachment means. For example, in a preferred embodiment, the angle 32 formed by the first and second legs 25b and 27 of the upwardly projecting triangular portion 26a is about 45°, and the angle 34 formed by the second leg 27 of the upwardly projecting triangular portion 26a and the first leg 29 of the adjacent downwardly projecting cradle portion 24b is about 120°.

The vertical spit 10 may be made of any suitable material well known to those skilled in the art. Preferably, the vertical spit is made of a heat-proof metal such as stainless steel or Teflon ® which enables the vertical spit to withstand standard cooking and roasting temperatures and enables easy cleaning and application and removal of the fowl.

As best shown in FIG. 3, a fowl 30, such as a chicken or other bird, is placed on one of the roast retaining means 22a of the vertical spit 10 by placing the carcass of the fowl 30 over an upwardly projecting triangular portion 26a and positioning the trussed legs 28 of the fowl 30 in the downwardly projecting cradle portion 24a. In this manner, no strings, ties, clips, or additional attachments are necessary to securely attach the fowl 30 to the vertical spit 10. The roast retaining means 22a also facilitates the quick and easy application and removal of a fowl or other roast on the vertical spit 10.

The vertical spit of the invention has many advantages. First, the vertical spit enables the display, roasting, or warming of fowl such as chickens, birds or other roasts in a small amount of space. Second, the vertical spit can be used with many different types of oven designs. Third, the vertical spit is a simple, economical design which enables easy and inexpensive manufacture. Fourth, the vertical spit is easy to use and enables the user to avoid cumbersome attachment arrangements such as ties, skewers, clips, etc. Fifth, the vertical spit enables easy placement and removal of fowl such as chickens, birds, or other roasts. In addition to time savings, this has the advantage of preventing common types of injuries associated with food preparation such as burns and cuts.

While the vertical spit of the invention has been described with respect to specific embodiments, many modifications may be made without departing from the spirit and scope of the invention. For example, those skilled in the art will recognize that two or more vertical spits of the invention could be used in one display, roasting, or warming oven.

What is claimed is:

1. A vertical spit for retaining one or more fowl during display, roasting or warming comprising a unitary zig-zagging rod comprising two or more roast retaining means, each roast retaining means comprising:
    (a) a downwardly projecting cradle portion for holding trussed legs of the fowl; and
    (b) an upwardly projecting triangular portion for insertion into a carcass of the fowl;
wherein each roast retaining means is positioned in continuous vertical relationship along the vertical spit and wherein each roast retaining means on said spit projects from an opposite side of the vertical spit from an adjacent roast retaining means.

2. The vertical spit of claim 1 wherein each downwardly projecting cradle comprises a leg which is one and the same with and forms a leg of an adjacent upwardly projecting triangular portion.

* * * * *